United States Patent [19]
Horie et al.

[11] Patent Number: 5,928,351
[45] Date of Patent: Jul. 27, 1999

[54] PARALLEL COMPUTER SYSTEM WITH COMMUNICATIONS NETWORK FOR SELECTING COMPUTER NODES FOR BARRIER SYNCHRONIZATION

[75] Inventors: Takeshi Horie; Masaaki Nagatsuka; Kenichi Kobayashi; Osamu Shiraki, all of Kanagawa, Japan

[73] Assignee: Fujitsu Ltd., Kawasaki, Japan

[21] Appl. No.: 08/764,109

[22] Filed: Dec. 6, 1996

[30] Foreign Application Priority Data

Jul. 31, 1996 [JP] Japan ................................. 8-202271

[51] Int. Cl.$^6$ ................................................ G06F 13/00
[52] U.S. Cl. ........................ 712/11; 395/800.13; 712/13
[58] Field of Search .............................. 395/200.78, 553, 395/672, 800.11, 800.13, 800.16, 800.17

[56] References Cited

U.S. PATENT DOCUMENTS

| | | | |
|---|---|---|---|
| 5,127,092 | 6/1992 | Gupta et al. | 395/375 |
| 5,365,228 | 11/1994 | Childs et al. | 340/825.8 |
| 5,434,995 | 7/1995 | Oberlin et al. | 395/550 |
| 5,448,732 | 9/1995 | Matsumoto | 395/650 |
| 5,519,877 | 5/1996 | Yoneda et al. | 395/800 |
| 5,682,480 | 10/1997 | Nakagawa | 395/200.19 |
| 5,721,921 | 2/1998 | Kessler et al. | 395/672 |
| 5,765,009 | 6/1998 | Ishizaka | 395/800 |

FOREIGN PATENT DOCUMENTS 4-283850  10/1992  Japan .

*Primary Examiner*—Lance Leonard Barry, Esq.
*Attorney, Agent, or Firm*—Staas & Halsey

[57] ABSTRACT

A parallel computer system capable of arbitrarily selecting nodes participating in barrier synchronization while enabling an arbitrary number of node groups to independently execute a process requiring the barrier synchronization. A communication network for the parallel computer system includes a plurality of routing controllers. Each routing controller has a register for setting a predetermined number of receipts of barrier synchronization request messages from other routing controllers, a destination to which the barrier synchronization request message is transmitted, and a destination to which a barrier synchronization establishment message is transmitted. If a destination of transmission of the barrier synchronization request message is set when completing a predetermined number of receipts of the barrier synchronization request messages and receipts of a barrier synchronization request message from a self-node, the barrier synchronization request message is transmitted to that destination of transmission. If the transmission destination is not set, the barrier synchronization establishment message is transmitted to the set transmission destination of the barrier synchronization establishment message. When receiving the barrier synchronization establishment message, the barrier synchronization establishment message is also transmitted to the set transmission destination of the barrier synchronization establishment message.

12 Claims, 5 Drawing Sheets

PARALLEL COMPUTER SYSTEM WITH COMMUNICATIONS NETWORK FOR SELECTING COMPUTER NODES FOR BARRIER SYNCHRONIZATION

BACKGROUND OF THE INVENTION

1. Field of the Invention

The present invention relates generally to a parallel computer system and, more particularly, to a parallel computer system, including a one-to-one communication network, for actualizing barrier synchronization through this communication network.

2. Description of the Related Art

In a parallel computer system, a plurality of computer nodes (which are also simply called "nodes") execute arithmetic processes in parallel. Each computer node, if the necessity arises, performs communications with other communication nodes via a communication network connected to all the computer nodes, thereby acquiring data held by other computer nodes and continuing the arithmetic process by use of these pieces of data. In such a parallel computer system, each computer node is required to wait for the acquisition of the data till the data needed by the computer node itself are calculated by other computer nodes. Further, the computer node that holds the data needed by other computer nodes is not allowed to execute an arithmetic process to update the same data until the relevant other computer nodes refer to the data.

If a multiplicity of computer nodes must effect such cooperative operations, it is practiced that synchronization known as barrier synchronization is taken.

The prior art parallel computer system involves the use of a barrier synchronization-only network based on one or a plurality of physical tree structures. Consequently, there is a problem in which the computer nodes participating in the barrier synchronization can not be arbitrarily selected. Moreover, a number of settable synchronizing processes is also unequivocally determined depending on a configuration of the barrier synchronization-only network.

SUMMARY OF THE INVENTION

Accordingly, it is a primary object of the present invention to provide a parallel computer system capable of arbitrarily selecting nodes which participate in barrier synchronization and enabling an arbitrary number of node groups each consisting of a plurality of nodes to independently execute processes requiring the barrier synchronization.

To accomplish the above object, according to the present invention, a parallel computer system, in which communications between a plurality of nodes are performed by use of a communication network constructed of a plurality of routing controllers connected to the plurality of nodes, is constructed of the plurality of routing controllers each including a first barrier synchronization request message receiving unit, a second barrier synchronization request message receiving unit, a storage unit, a first transmitting unit, and a second transmitting unit.

The first barrier synchronization request message receiving unit receives barrier synchronization request messages from other routing controllers. The second barrier synchronization request message receiving unit receives the barrier synchronization request message from the node connected to the routing controller itself. The storage unit stores a predetermined number of receipts defined as a number of the barrier synchronization request messages that should be received by the first barrier synchronization request message receiving unit, a first item of node identification data defined as identification data of the node to which the barrier synchronization request message should be transmitted, and a second item of node identification data defined as identification data of the node to which the barrier synchronization establishment message should be transmitted.

The first transmitting unit judges whether or not the storage unit is stored with the first node identification data when completing receipts of the barrier synchronization request messages the number of which is equal to the predetermined number of receipts, and completing receipts of the barrier synchronization request messages by the second barrier synchronization request message receiving unit. Then, when the storage unit is stored with the first node identification data, the first transmitting unit transmits the barrier synchronization request message to the node identified by the first node identification data. On the other hand, if the storage unit is not stored with the first node identification data, the first transmitting unit notifies the node connected to the first transmitting unit itself and transmits the barrier synchronization establishment message to the node identified by the second node identification data within the storage unit.

The second transmitting unit notifies the node connected to the second transmitting unit itself of such a purport that the barrier synchronization is established when receiving the barrier synchronization establishment message with respect to the node connected to the second transmitting unit itself from the first transmitting unit within other routing controller, and transmits the barrier synchronization establishment message to the node identified by the second node identification data in the storage unit.

Thus, each of the routing controllers defined as constructive elements of the parallel computer system according to the present invention is so constructed as to be capable of setting conditions (including destinations of transmission) for transmitting the barrier synchronization request message and the barrier synchronization establishment message.

Hence, if proper transmission conditions are set respectively in the plurality of routing controllers corresponding to the nodes that should participate in the barrier synchronization, it is feasible to make one (the routing controller having no first node identification data) of the routing controllers judge the establishment of the barrier synchronization (which implies that the barrier synchronization request messages are transmitted from all the nodes participating in the barrier synchronization). Further, as obvious from the construction given above, the parallel computer system of the present invention enables the arbitrary number of node groups each consisting of the plurality of nodes to independently execute the processes requiring the barrier synchronization.

Actualization of the parallel computer system of the present invention involves the use of storage unit capable of storing some pieces of second node identification data. A transmitting unit usable as the first transmitting unit may transmit the barrier synchronization establishment message to each node identified by each piece of the second node identification data stored in the storage unit in the case of the storage unit being stored with no first node identification data when completing the receipts of the barrier synchronization request messages the number of which is equal to the predetermined number of receipts, and completing the receipts of the barrier synchronization request messages by the second barrier synchronization request message receiving unit.

Moreover, the storage unit usable herein is capable of storing some pieces of first node identification data. The first transmitting unit usable herein transmits the barrier synchronization request message to each node identified by each piece of first node identification data if the storage unit is stored with one or more pieces of first node identification data.

According to the thus constructed parallel computer system, each routing controller is capable of transmitting the barrier synchronization establishment (request) messages to the plurality of routing controllers, and therefore the barrier synchronization can be established at a much higher velocity.

The routing controller may further include a counting unit for counting the number of receipts of the barrier synchronization request messages by the first barrier synchronization request message receiving unit, and a data outputting unit for, when the number of receipts that is counted by the counting unit is coincident with the predetermined number of receipts that is stored in the storage unit, outputting data indicating this purport. The first transmitting unit can be actualized with a simple construction by adding the above units.

Moreover, the routing controller may further include a third transmitting unit and a fourth transmitting unit that function as follows. The third transmitting unit transmits a barrier synchronization establishment message ACK (acknowledge) indicating that the barrier synchronization establishment message is received, to the routing controller that has transmitted, when receiving the barrier synchronization establishment message with respect to the node connected to the routing controller itself, this barrier synchronization establishment message. The fourth transmitting unit transmits a barrier synchronization request message ACK indicating that the barrier synchronization request message is received, to the routing controller that has transmitted, when the first barrier synchronization request message receiving unit receives the barrier synchronization request message, this barrier synchronization request message. The recognizing unit recognizes degrees of progress of processing for the barrier synchronization establishment message and the barrier synchronization request message by monitoring a state of receiving the barrier synchronization establishment message ACK and the barrier synchronization request message ACK.

Furthermore, if the routing controller is constructed by adding the recognizing unit, the third transmitting unit desirably used herein, if the barrier synchronization establishment message received is invalid, transmits a barrier synchronization request message NAK indicating this purport to the routing controller which has transmitted the barrier synchronization establishment message. The fourth transmitting unit desirably used herein, if the barrier synchronization establishment message received is invalid, transmits a barrier synchronization establishment message NAK (negative acknowledge) conceived as a message indicating this purport to the routing controller which has transmitted that barrier synchronization establishment message. The recognizing unit desirably used herein monitors the states of receiving the barrier synchronization request message NAK and the barrier synchronization establishment message NAK and, when detecting that one of the barrier synchronization request message NAK and the barrier synchronization establishment message NAK is received, notifies the node connected to the recognizing unit itself of an occurrence of abnormality.

Further, each of the nodes usable herein as those constituting the parallel computer system transmits the barrier synchronization request message containing the group identification data to the second barrier synchronization request message receiving unit. The first transmitting unit and the second transmitting unit usable herein determine processing contents for the respective messages in accordance with the group data contained in the messages. In this case, the storage unit is stored with plural items of barrier synchronization data containing the predetermined number of receipts, the first node identification data and the second node identification data, which are made corresponding to the group identification data so that each transmitting unit is capable of executing the process corresponding to the group data. In the thus constructed parallel computer system, one single node can be used in common to the plurality of barrier synchronization groups.

Also, the node used herein judges whether the barrier synchronization is established or not based on the data stored in a predetermined address on a memory incorporated thereinto. Units used herein as the first transmitting unit and the second transmitting unit within each routing controller notify the nodes of the purport that the barrier synchronization is established by rewriting the data stored in the predetermined address on the memory incorporated into the node.

Furthermore, each node used herein transmits the barrier synchronization request message containing the address data indicating a storage position on the memory incorporated thereinto, of the data showing whether or not the barrier synchronization is established. There may also be used the first transmitting unit and second transmitting unit for notifying the self-node of the purport that the barrier synchronization is established by rewriting the data designated by the address data contained in the barrier synchronization request message received within the memory of the self-node.

According to the above-constructed parallel computer system, each node is capable of recognizing the establishment of the barrier synchronization in short time.

In addition, in the case of constructing the parallel computer system of the present invention, each routing controller may incorporate some buffers for temporarily storing received messages or messages that should be transmitted. It is desirable that there be adopted units as the first and second transmitting units for setting a virtual channel on the communication network by making use of these buffers and transmitting the respective messages relative to the barrier synchronization by use of this virtual channel.

When the parallel computer system is constructed in this manner, the messages for the barrier synchronization can be exchanged without undergoing any influences of other message exchanges. Accordingly, the barrier synchronization can be attained at a high velocity.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENT

An embodiment of the present invention will hereinafter be described with reference to the accompanying drawings.

Figure 1:
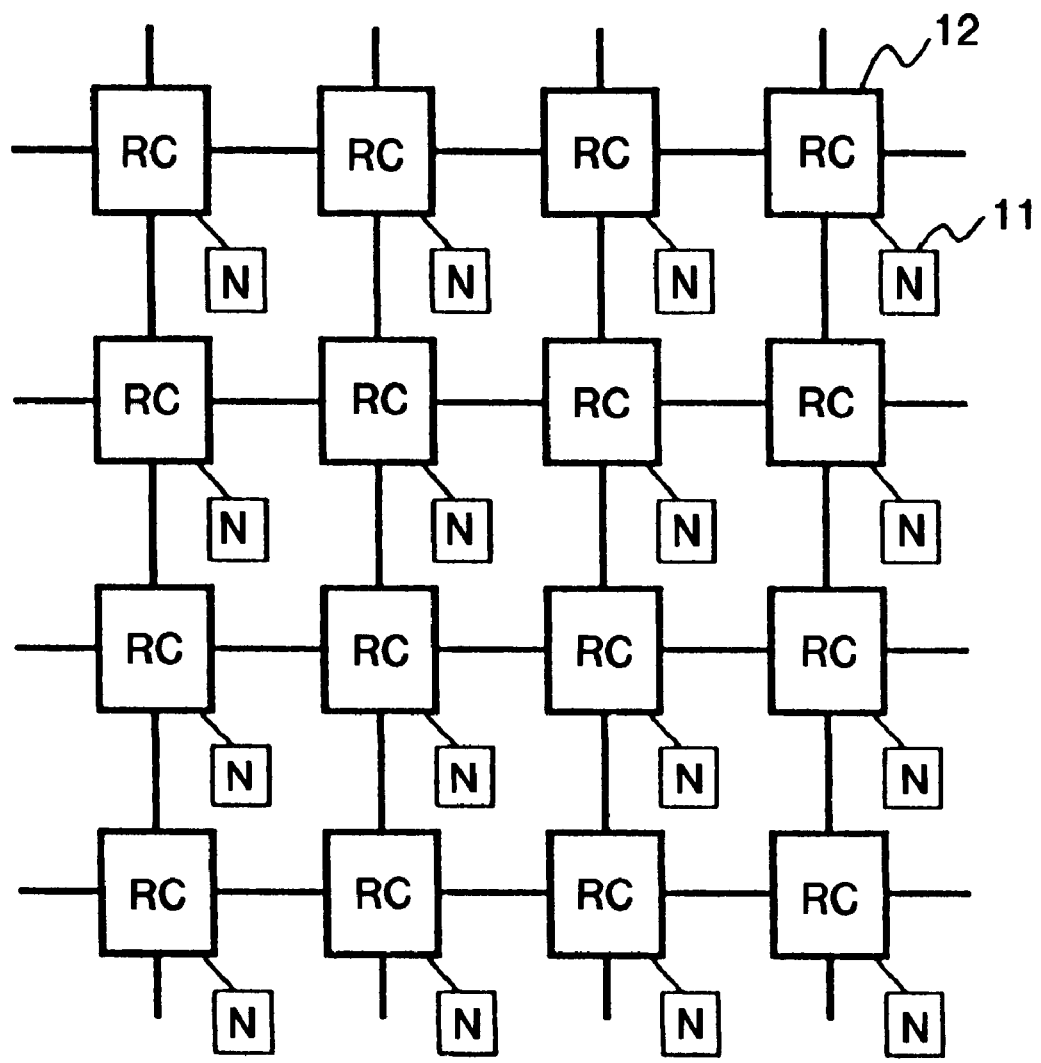
FIG. 1 is a block diagram illustrating a whole construction of a parallel computer system in one embodiment of the present invention.

FIG. 1 illustrates an outline of construction of a parallel computer system in accordance with one embodiment of the present invention. As shown in FIG. 1, the parallel computer system in the embodiment is constructed of a plurality of computer nodes 11 (hereinafter simply termed "nodes" or N in FIG. 1 ), and a plurality of routing controllers 12 (or RC in FIG. 1) connected to the respective nodes 11. Each routing controller 12 is connected via physical channels (transmission paths) to each of other four routing controllers 12 so as to construct a two-dimensional mesh-like communication network.

A node 11 is defined as a unit including a processor and a memory that are unillustrated. Each node 11 executes an arithmetic process independently of other nodes 11. Further, the node 11, when the necessity arises, performs communications with other nodes 11 by use of the communication networks formed by the routing controllers 12.

Each routing controller 12, when receiving a message (communication information) from the node 11 connected to the controller 12 itself (which is hereinafter termed a "self-node"), transmits this message to the routing controller 12 corresponding to a transmission destination node number contained in a header of the message. Also, each of the routing controllers 12, when receiving a message the transmission destination node number of which is not identical with a node number of the self-node, also transmits this message to the routing controller 12 corresponding to the transmission destination node number. Then, each routing controller 12, when receiving from other routing controller 12 a message the transmission destination node number of which is identical with the node number of the self-node, transfers the received message to the self-node.

Furthermore, each routing controller 12 incorporates a buffer for temporarily storing the message. When transferring the message between the routing controllers 12, so-called virtual channel flow control is carried out, wherein a virtual channel is set on the physical channel by making use of this buffer, and the message is thus transferred via this virtual channel.

In addition to the above-described normal one-to-one communication function, the routing controller 12 incorporates a function for actualizing barrier synchronization between an arbitrary number of nodes constituting the parallel computer system. This function will be hereinafter specifically explained. Note that the barrier synchronization is actualized in such a way that a barrier synchronization request message is issued from each of the nodes 11 participating in the barrier synchronization, and a variety of messages are thereby transmitted and received between the plurality of routing controllers 12. For explanatory convenience, however, first of all, a content of operation of the sole routing controller 12 will be explained.

Figure 2:
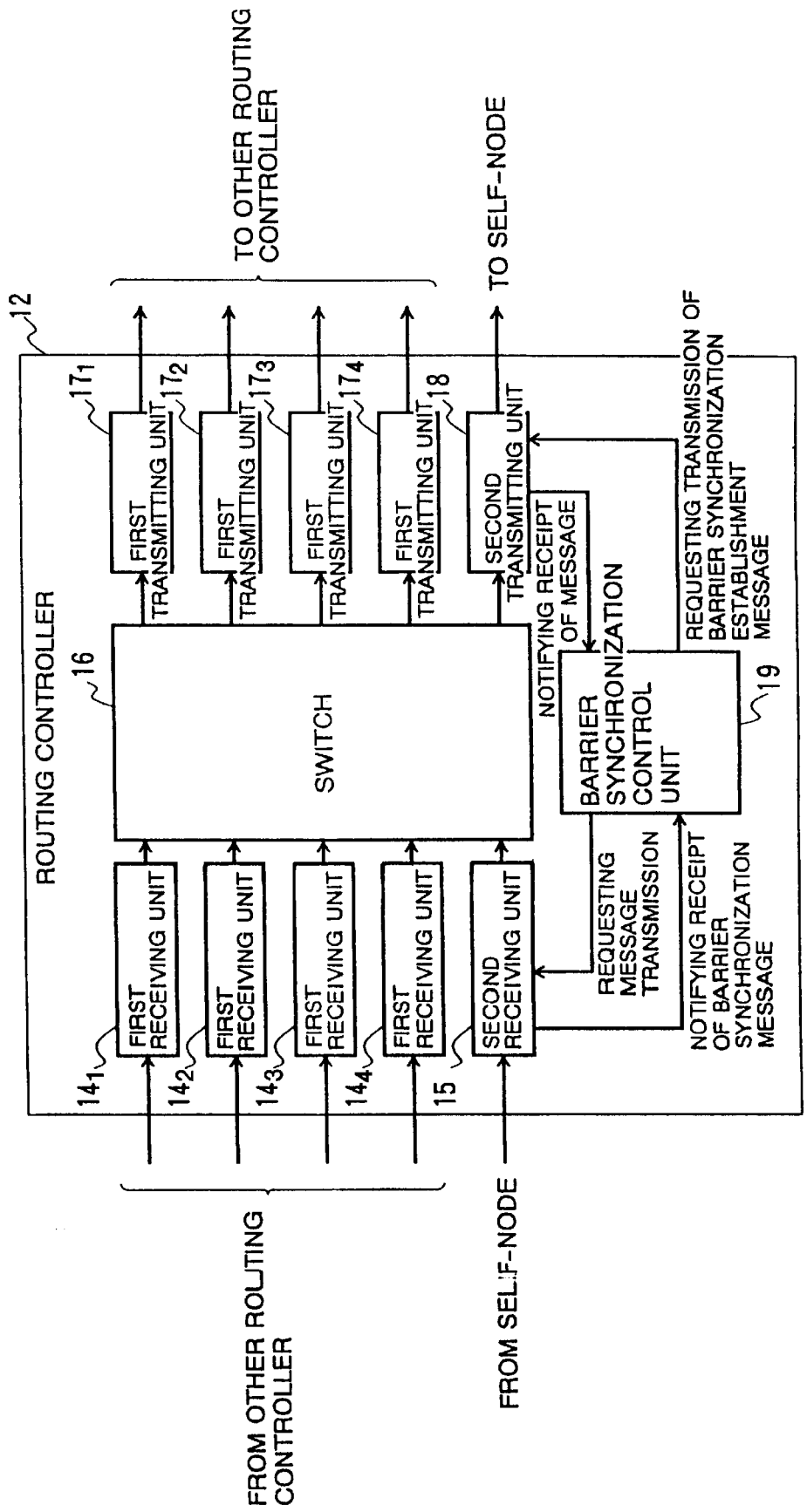
FIG. 2 is a block diagram showing a construction of a routing controller incorporated into the parallel computer system in the embodiment.

FIG. 2 illustrates an outline of construction of the routing controller 12. As shown in FIG. 2, the routing controller 12 is provided with first receiving units $14_1$–$14_4$, a second receiving unit 15, a switch 16, first transmitting units $17_1$–$17_4$, a second transmitting unit 18, and a barrier synchronization control unit 19. Note that the routing controller 12 is actualized by an LSI (Large Scale Integrated Circuit).

The switch 16 is a mechanism for supplying one of the first transmitting units $17_1$–$17_4$ and the second transmitting unit 18 with the communication information (message) given from the first receiving unit 14 for the second receiving unit 15.

Each of the first receiving units $14_1$–$14_4$ receives the message transmitted by one of the first transmitting units $17_1$–$17_4$ incorporated into one of four other routing controllers 12. The first receiving units $14_1$–$14_4$, when receiving the message from one of four other routing controllers 12, identifies the node to which the message should be transferred based on the destination node number contained in the header of that message. Then, first receiving units $14_1$–$14_4$ control the switch 16 so that the inputted message is transferred to the identified node, and supplies the switch 16 with the same message.

For instance, the first receiving units $14_1$–$14_4$, when receiving the message to the self-node (connected to the controller itself which these units belong to), supply the second transmitting unit 18 with the received message by controlling the switch 16. Further, when receiving a message that should be transferred to other node (exclusive of the self-node), the first receiving units $14_1$–$14_4$ supply the received message to one of the first transmitting units $17_1$–$17_4$ by controlling the switch 16. Incidentally, each of the first receiving units $14_1$–$14_4$ is provided with a buffer used for the above-described virtual channel flow control.

The second receiving unit 15, when supplied with the normal message from the self-node, identifies the node to which the message should be transferred based on the destination node number contained in the header of the same message. Then, the second receiving unit 15 controls the switch 16 so that the supplied message is transferred to the identified node, and supplies the switch 16 with the message from the self-node. Also, the second receiving unit 15, upon receiving the barrier synchronization request message from the self-node, transmits a barrier synchronization request message receiving notice to the barrier synchronization control unit 19 without supplying that message to the switch 16.

Note that the barrier synchronization request message given from the self-node includes a piece of address data, indicating a storage position on the memory within the node, of a barrier synchronization flag defined as a flag for showing whether the barrier synchronization is established or not. The barrier synchronization control unit 19, when receiving the barrier synchronization request message receiving notice, receives this pieces of address data and, when detecting that the barrier synchronization has been established, notifies the self-node of the establishment of the barrier synchronization by updating the data identified by the address data, on the memory of the self-node.

The second receiving unit 15 executes processes such as supplying the switch 16 with a variety of messages upon a request of transmission from the barrier synchronization control unit 19. Furthermore, the second receiving unit 15, when finishing the supply of the message requested from the barrier synchronization control unit 19 to the switch 16, outputs a message transmission completion notice to the barrier synchronization control unit 19. Note that the messages that the barrier synchronization control unit 19 requests the second receiving unit 15 to transmit, are a barrier synchronization request message, a barrier synchronization establishment message, a barrier synchronization request message ACK, a barrier synchronization establishment message ACK, a barrier synchronization request message NAK, and a barrier synchronization establishment message NAK. Although the details of the respective messages will be explained later, the barrier synchronization request messages ACK/NAK and the barrier synchronization establishment messages ACK/NAK are classified as response messages given back to the routing controllers transmitting the respective messages, from the barrier synchronization control unit that has detected the receipt of the barrier synchronization request message and the barrier synchronization establishment message.

The first transmitting units $17_1$–$17_4$ transmit the message supplied from the switch 16 to other routing controllers connected to the first transmitting units themselves.

The second transmitting unit 18, if the message supplied from the switch 16 is a normal message, supplies the self-node with this message. On the other hand, if the message supplied from the switch 16 is a message pertaining to the above barrier synchronization, the second transmitting unit 18 transmits a notice of receiving this message to the barrier synchronization control unit 19.

Also, the second transmitting unit 18, when the barrier synchronization control unit 19 gives an indication to transmit the barrier synchronization establishment message to the self-node, updates the barrier synchronization flag on the memory within the self-node based on the address data (designated by the self-node in the barrier synchronization request message) relative to the barrier synchronization flag, which data is contained in that indication.

A construction and an operation of the barrier synchronization control unit 19 will hereinafter be discussed with reference to FIGS. 3 and 4.

Figure 3:
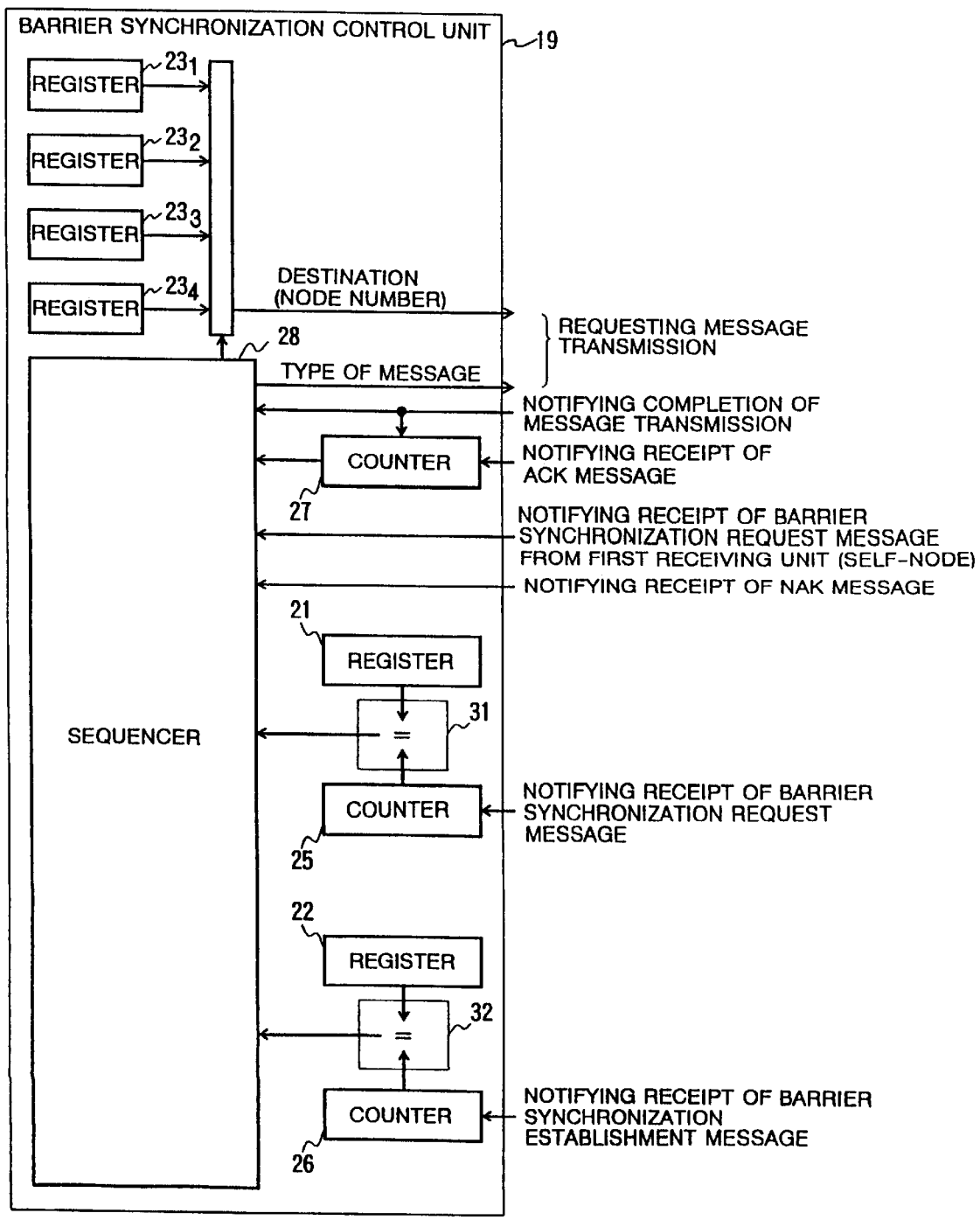
FIG. 3 is a block diagram illustrating a construction of a barrier synchronization control unit provided in the routing controller.
Figure 4:
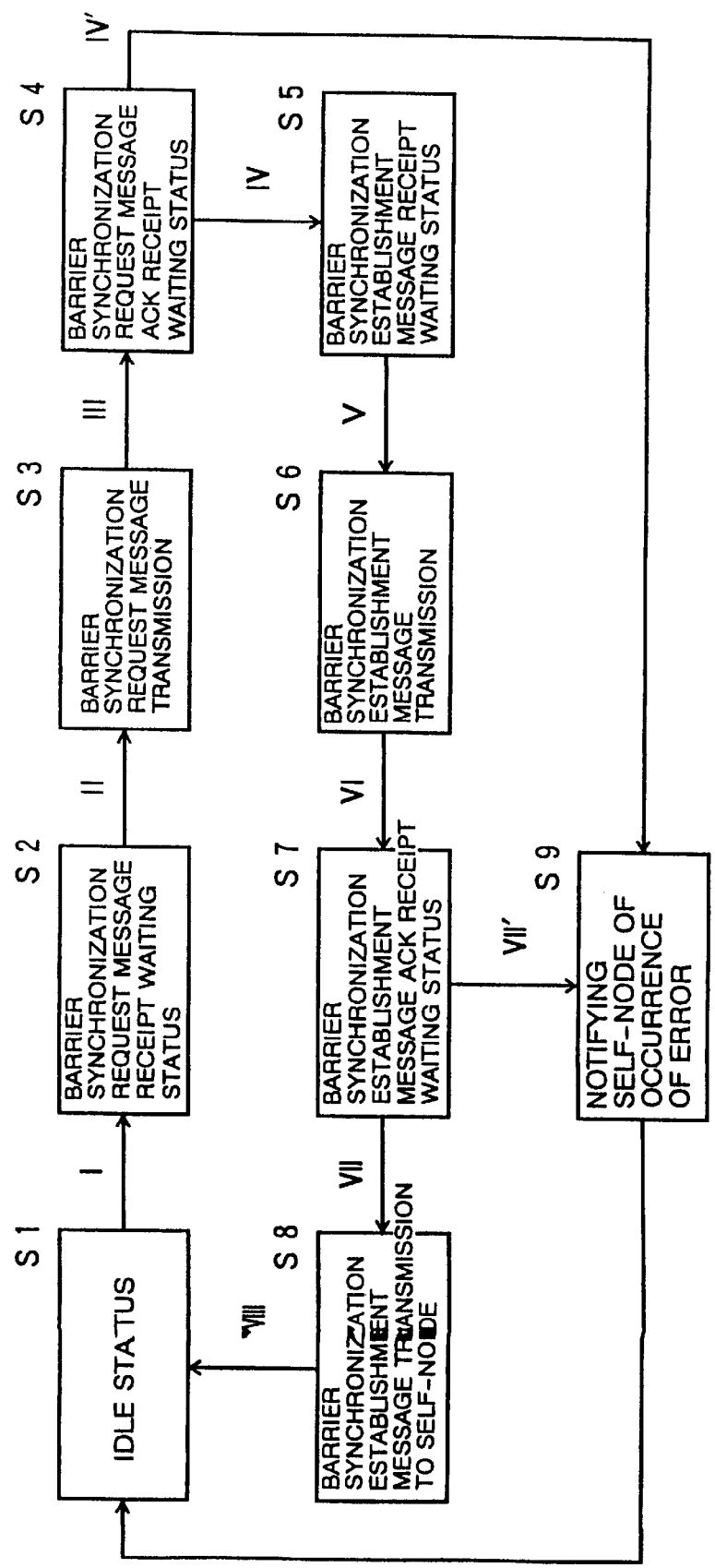
FIG. 4 is a diagram showing a status transition of a sequencer provided in the barrier synchronization control unit.

Note that FIG. 3 is a block diagram showing the barrier synchronization control unit 19, and FIG. 4 is a diagram showing a transition of status of a sequencer 28 provided in the barrier synchronization control unit 19.

As shown in FIG. 3, the barrier synchronization control unit 19 includes a number-of-receipts-of-barrier-synchronization-request-message register 21, a number-of-transmissions-of- barrier-synchronization-request-message register 22, four pieces of destination registers $23_1$–$23_4$, a barrier synchronization request message receipt counter 25, a barrier synchronization establishment message receipt counter 26, a barrier synchronization message ACK counter 27, a sequencer 28, and comparators 31, 32.

Set in the individual registers 21, 22, $23_1$–$23_4$ are the following data in advance of executing processes requiring the barrier synchronization.

The number of barrier synchronization request messages that are to be received from other nodes, is set in the number-of-receipts-of-barrier-synchronization-request-message register 21. The number of other nodes to which the barrier synchronization request message should be transmitted, is set in the number-of-transmissions-of-barrier-synchronization-request-message register 22. A node number of the node to which the barrier synchronization establishment message should be transmitted is set in m-pieces of destination registers $23_1$ through $23_m$ (m is a numerical value set in the number-of-receipts-of-barrier-synchronization-request-message register 21; $0 \leq m \leq 4$) among the destination registers $23_1$–$23_4$. Further, a node number of the node to which the barrier synchronization request message should be transmitted is set in n-pieces of destination registers $23_4$ through $23_{5-n}$ (n is a numerical value set in the number-of-transmissions-of-barrier-synchronization-request-message register 22; $0 \leq n$, n+m<4).

The barrier synchronization request message receipt counter 25, when receiving the barrier synchronization request message receiving notice from the second transmitting unit 18, increments the numerical value held inside by only "1". That is, the barrier synchronization request message receipt counter 25 counts a total number of barrier synchronization request messages received from other routing controllers 12.

The value of the barrier synchronization request message receipt counter 25 and the value of the number-of-receipts-of-barrier-synchronization-request-message register 21, are inputted to the comparator 31. The comparator 31, if the values of these two inputs are coincident with each other, outputs a signal indicating this purport to the sequencer 28.

The barrier synchronization establishment message receipt counter 26, when receiving the barrier synchronization establishment message receiving notice from the second transmitting unit 18, increments the numerical value held inside by only "1". That is, the barrier synchronization establishment message receipt counter 26 counts a total number of barrier synchronization establishment messages received from other routing controllers 12.

The value of the barrier synchronization establishment message receipt counter 26 and the value of the number-of-transmissions-of-barrier-synchronization-request-message register 22, are inputted to the comparator 32. The comparator 32, if the values of these two inputs are coincident with each other, outputs a signal indicating this purport to the sequencer 28.

The barrier synchronization message ACK counter 27, when receiving a message transmission completion notice from the second receiving unit 15, increments the numerical value held inside by only "1". Further, the barrier synchronization message ACK counter 27, when receiving a barrier synchronization request message ACK or a barrier synchronization establishment message ACK from the second transmitting unit 18, decrements the numerical value held inside by only "1". Moreover, the barrier synchronization message ACK counter 27, if the value held by the counter 27 itself is "0", outputs a signal showing this purport to the sequencer 28.

An operation of the sequencer 28 will be hereinbelow explained in greater detail with reference to FIG. 4.

The sequencer 28 is normally in an idle status and, when receiving the barrier synchronization request message receiving notice from the second receiving unit 15 (I), transits to a barrier synchronization request message receipt waiting status S2. More specifically, the sequencer 28, when the self-node outputs the barrier synchronization request message, transits to the barrier synchronization request message receipt waiting status S2.

In the status S2, the sequencer 28 judges whether or not the value of the barrier synchronization request message receipt counter 25 is coincident with the value of the number-of-receipts-of-barrier-synchronization-requestmessage register 21 on the basis of the signal given from the comparator 31. If the two values are coincident with each other at such a stage that the sequencer 28 has made transition to the status S2 (II), i.e., if the barrier synchronization request messages the number of which corresponds to the numerical value set in the number-of-receipts-barrier-synchronization-request-message register 21 have already been received, the sequencer 28 immediately executes a barrier synchronization request message transmission S3. Whereas if the two values are not coincident, the sequencer 28 awaits till these values get coincident and, when coincident with each other (II), performs the barrier synchronization request message transmission S3.

In the status S3, the sequencer 28 requests the second receiving unit 15 to transmit the barrier synchronization request messages the number of which corresponds to the numerical value set in the number-of-transmissions-of-barrier-synchronization-request-message register 22. On this occasion, the sequencer 28 notifies the second receiving unit 15 of the node numbers stored in the destination registers $23_{5-n}$–$23_4$ (n is the numerical value set in the number-of-transmissions-of-barrier-synchronization-request-message register 22), thereby designating a destination of the barrier synchronization request message.

Incidentally, as already explained, the second receiving unit 15, when transmitting the barrier synchronization request message, outputs the message transmission completion notice to the barrier synchronization control unit 19. Also, the barrier synchronization message ACK counter 27, upon receiving the transmission completion notice thereof, increments the numerical value held inside. Therefore, when at the end of the status S3, it follows that the barrier synchronization message ACK counter 27 holds a total number of the barrier synchronization request messages transmitted from the routing controllers.

After making the request for transmitting the barrier synchronization request message, the sequencer 28 transits to a barrier synchronization request message ACK receipt waiting status S4 for monitoring the signal(which is the value of the barrier synchronization message ACK counter 27) from the barrier synchronization message ACK counter 27 (III). Then, the sequencer 28, when detecting that the barrier synchronization message ACK counter 27 becomes "0" (IV), transits to a barrier synchronization establishment message waiting status S5. To be more specific, when receiving the barrier synchronization request messages ACK the number of which is the same as the number of barrier synchronization request messages transmitted, the sequencer 28 transits to the barrier synchronization establishment message waiting status S5.

In the status S5, the sequencer 28 judges whether or not the value of the barrier synchronization establishment message receipt counter 26 is coincident with the value of the number-of-transmissions-of-barrier-synchronization-request-message register 22 on the basis of the signal given from the comparator 32. Then, if the two values are coincident with each other, i.e., when receiving the barrier synchronization establishment messages the number of which is the same as the number of barrier synchronization request messages transmitted (V), the sequencer 28 executes a barrier synchronization establishment message transmission S6.

In the status S6, the sequencer 28 requests the second receiving unit 15 to transmit the barrier synchronization establishment messages the number of which corresponds to the numerical value stored in the number-of-receipts-of-barrier-synchronization-request-message register 21. On this occasion, the sequencer 28 notifies the second receiving unit 15 of the node numbers stored in the destination registers $23_1$–$23_m$, thereby designating a destination of the barrier synchronization establishment message. Note that when this status S6 comes to an end, as in the same way with the end of the status S3, it follows that the barrier synchronization message ACK counter 27 is stored with the total number of barrier synchronization establishment messages transmitted from the self routing controller 12.

Thereafter, the sequencer 28 transits to a barrier synchronization establishment message ACK waiting status S7 (VI), and starts monitoring the value of the barrier synchronization message ACK counter 27. Then, when detecting that the barrier synchronization message ACK counter 27 becomes "0" (VII), the sequencer 28 performs a barrier synchronization establishment message transmission S8 to the self-node and reverts to the idle status S1 (VIII).

Further, the sequencer 28, in parallel to the operation described above, makes use of a barrier synchronization group identifier (the details thereof will be stated later) contained in a variety of messages received by the routing controllers 12 and transmitting node numbers as well, and thereby judges whether or not these messages are normal. Subsequently, the sequencer 28, if the received message is regarded normal, requests the second receiving unit 15 to transmit the message ACK in response to the above message. While on the other hand, if the received message is not regarded normal, the sequencer 28 requests the second receiving unit 15 to transmit the message NAK in response to the above message.

Hence, it may happen that the sequencer 28 the barrier synchronization request message NAK and the barrier synchronization establishment NAK as well in statuses S4 and S7. The sequencer 28, when detecting the barrier synchronization request message NAK in the state S4 (VI'), and when detecting barrier synchronization establishment message NAK in the status S7 (VII'), executes an error occurrence notice S9 to the self-node, and reverts to the idle status S1.

Given next are explanations of the operations of the whole present parallel computer system constructed by use of the routing controllers 12 which operate as described above, and of procedures of setting the data in the respective registers 21, 22, $23_1$–$23_4$ within each of the routing controllers 12.

When the present parallel computer system is made to execute the process requiring the barrier synchronization, to begin with, a barrier synchronization request tree defined as tree for setting the notifying procedures of the barrier synchronization request message is determined for the plurality of nodes 11 (the routing controllers 12) required to take the barrier synchronization.

Figure 5:
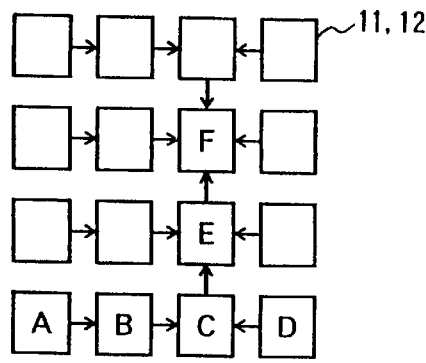
FIG. 5 is a schematic diagram of assistance in explaining a barrier synchronization request tree set for the parallel computer system in the embodiment.

For example, in the case of taking the barrier synchronization between 16 pieces of nodes shown in FIG. 1, the barrier synchronization request tree as schematically illustrated in FIG. 5 is determined for these nodes 11 (the routing controllers 12). Then, the data are set in the registers 21–23 incorporated into each of the routing controllers 12 so as to form the determined barrier synchronization request tree.

Actualization of the barrier synchronization request tree shown in FIG. 5 entails such an operation that the routing controller A transmits the barrier synchronization request message to the routing controller B. Therefore, a node number of a node B is set, as a node number of the node to which the barrier synchronization request message should be transmitted, in the destination register $23_4$ within the routing controller A. Further, it may suffice that the routing controller A transmits the barrier synchronization request message to only the routing controller B, and hence "1" defined as a total number of the barrier synchronization request messages that should be transmitted by the routing controller A. Moreover, the routing controller A receives no barrier synchronization request messages from other routing controllers, and therefore "0" is set in the number-of-receipts-of-barrier-synchronization-request-message register 21.

A routing controller C receives the barrier synchronization request messages from two routing controllers B, D, and is required to transmit the barrier synchronization request message to a routing controller E. Therefore, "2" is set in the number-of-receipts-of-barrier-synchronization-request-message register 21 within the routing controller C. Further, node numbers of the nodes B and D conceived as nodes to which the barrier synchronization establishment message should be transmitted, are set in the destination registers $23_1$, $23_2$. Also, the "1" is set in the number-of-transmissions-of-barrier-synchronization-request-message register 22, and the node number of the node E is set in the destination register $23_4$.

A routing controller F receives the barrier synchronization request messages from four routing controllers ambient thereto bit is not required to transmit the barrier synchronization request message to other routing controllers. Therefore, "4" is set in the number-of-receipts-of-barrier-synchronization-request-message register 21 within the routing controller F, and node numbers of four pieces of nodes ambient to the node F are set in the destination registers $23_1$–$23_4$. Further, "0" is set in the number-of-transmissions-of-barrier-synchronization-request-message register 22.

As a result of the settings described above, the comparator 31 notifies the sequencer 28, within the routing controller A, of the fact that the value of the register 21 is always coincident with the value of the counter 25. For this reason, the sequencer 28, when making transition from the idle status S1 to the barrier synchronization request message waiting status S2 as a result of receiving the barrier synchronization request message from the self-node, executes the barrier synchronization request message transmission S3 without awaiting till the barrier synchronization request message is received from other node in the status S2. That is, the routing controller A, when receiving the barrier synchronization request message from the self-node, immediately transmits the barrier synchronization request message to the routing controller B.

Further, "2" is set in the number-of-receipts-of-barrier-synchronization-request-message register 21 within the routing controller C. Hence, when in transition to the barrier synchronization request message receipt waiting status S2 upon receiving the barrier synchronization request message from the self-node, and if the barrier synchronization request messages are not received from the nodes B and D, the sequencer 28 within the routing controller C waits for the transmissions of the barrier synchronization request messages from these nodes. Then, the sequencer 28, if able to confirm the receipts of the barrier synchronization request messages from the nodes B and D, transmits the barrier synchronization request message to the routing controller E. Note that when receiving the barrier synchronization request messages from the nodes B, D before receiving the barrier synchronization request message from the self-node, the sequencer 28 transits to the status S3 without waiting for the receipt of the barrier synchronization request message in the status S2.

That is, the routing controller C, just when all the nodes A–D transmit the barrier synchronization request messages, transmit the barrier synchronization request message to the routing controller E.

The sequencer 28 within the routing controller F, since "4" is held in the number-of-receipts-of-barrier-synchronization-request-message register 21, judge whether the barrier synchronization request messages from four other nodes are received or not based on the signal given from the comparator 31 when in transition to the barrier synchronization request message receipt waiting status S2 from the idle status S1 upon receiving the barrier synchronization request message from the self-node. Subsequently, the sequencer 28, when having already received the barrier synchronization request messages from four other routing controllers, immediately transits to the status S3. Further, the sequencer 28, if there is a barrier synchronization request message that is not yet received, and when the receipts of those barrier synchronization request messages are completed, transmits to the status S3. However, "0" is set in the number-of-transmissions-of-barrier-synchronization-request-message register 22 within the routing controller F, and hence the sequencer 28 starts the barrier synchronization establishment message transmission S6 without particularly executing the processes in the statuses S3–S5.

Figure 6:
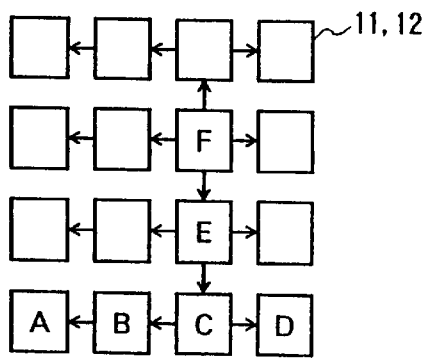
FIG. 6 is a schematic diagram of assistance in explaining a barrier synchronization establishment tree to be set when using the barrier synchronization request tree shown in FIG. 5.

That is, the sequencer 28 within the routing controller F recognizes that all the nodes relative to the barrier synchronization have transmitted the barrier synchronization request messages (which means that the barrier synchronization has been established) from the receipts of the barrier synchronization messages from the four nodes and of the barrier synchronization request message from the self-node. Then, the sequencer 28 within the routing controller F, as schematically shown in FIG. 6, transmits the barrier synchronization establishment message to the four routing controllers (corresponding to the nodes the numbers of which are stored in the destination registers $23_1$–$23_4$) which have sent the barrier synchronization request messages to the controllers themselves. Subsequently, the sequencer 28 waits for the barrier synchronization establishment messages ACK (or NAK) being transmitted from those four routing controllers (status S7) and, when receiving the four barrier synchronization establishment messages ACK, notifies the self-node of the fact that the barrier synchronization is established.

The respective routing controllers receiving the barrier synchronization establishment messages send the barrier synchronization establishment messages to the routing controllers, the number of which corresponds to the numerical value set in the number-of-receipts-of-barrier-synchronization-request-message register 21. The same routing controllers also notify the self-nodes of the establishment of the barrier synchronization.

According to the present parallel computer system, the above processes are executed by the individual routing controllers 12, and all the nodes 11 relative to the barrier synchronization are thereby informed of the establishment of the barrier synchronization. Then, the messages are received and transmitted between the nodes notified of the establishment of the barrier synchronization.

Incidentally, as discussed above, according to the present parallel computer system, the routing controller positioned on a root of the barrier synchronization request tree judges whether or not the barrier synchronization is established. It is therefore desirable that a configuration of the barrier synchronization request tree be determined so that the routing controller corresponding to the node transmitting the barrier synchronization request message latest becomes a root (the routing controller that first outputs the barrier synchronization establishment message).

The reason for this will be elucidated as follows. If the node transmitting the barrier synchronization request message latest is made corresponding to, e.g., a leaf exclusive of the root of the barrier synchronization request tree, there is further needed a time for which the barrier synchronization request message reaches the root before the transmission of the barrier synchronization establishment message is actually started in spite of satisfying the condition for establishing the barrier synchronization at such a stage that the barrier synchronization request message is transmitted from that node.

As described above in detail, each of the routing controllers constituting the parallel computer system in the embodiment is so constructed as to be capable of setting the destinations to which the barrier synchronization request messages are transmitted (the configurations of the barrier synchronization request tree), and the destinations to which the barrier synchronization establishment messages are transmitted (the barrier synchronization establishment tree).

Figure 7:
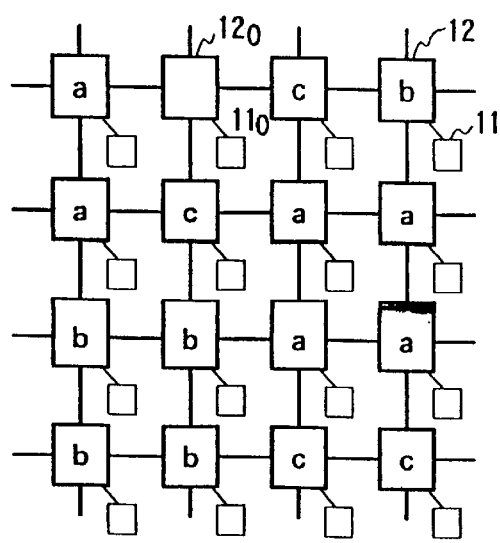
FIG. 7 is a block diagram of assistance in explaining a mode of using the parallel computer system in the embodiment.

Therefore, as schematically shown in FIG. 7, the plurality of nodes constituting the parallel computer system may also be classified into some barrier synchronization groups, and each of these barrier synchronization groups may be assigned to execute the process requiring the barrier synchronization. Note that node groups to which the nodes 11 corresponding to the routing controllers 12 belong are indicated by symbols such as "a", "b", "c" displayed within the routing controllers 12 in FIG. 7.

Prepared also is a management node such as a node $11_0$ that does not belong to any node groups, and, when notified of an end of the process requiring the barrier synchronization from the node belonging to one of the barrier synchronization groups, the parallel computer system can be also operated so that a new node synchronization groups is set by the node $11_0$.

The parallel computer system in the embodiment can be modified in a variety of forms. For instance, the parallel computer system can be constructed so that each of the nodes is informed of the barrier synchronization establishment message through a barrier synchronization establishment tree assuming a configuration different from the barrier synchronization request tree. In this case, there are prepared separately a destination register for storing pieces of node identification data of the nodes which transmit the barrier synchronization request messages, and a destination register for storing pieces of node identification data of the node that should transmit the barrier synchronization establishment messages. Further, if each routing controller incorporates a control unit for executing in parallel processes corresponding to those of the barrier synchronization control unit on the barrier synchronization group basis, it follows that there can be constructed in which the single node can be simultaneously used within the plurality of barrier synchronization groups.

Furthermore, according to the parallel computer system in the embodiment, the communication network is constructed by connecting the routing controllers in the mesh-like configuration. As a matter of course, however, the communication network may be constructed by other methods of connecting the routing controllers in a torus-like configuration, etc.

Moreover, the parallel computer system in the embodiment are provided with the routing controllers and the nodes, separately. The parallel computer system may be, however, constructed by combining the nodes incorporating the routing controllers.

Further, as a matter of course, specific virtual channels may also be employed as channels for transmitting the respective messages pertaining to the barrier synchronization.

It is apparent that, in this invention, a wide range of different working modes can be formed based on the invention without deviating from the spirit and scope of the invention. This invention is not restricted by its specific working modes except being limited by the appended claims.

What is claimed is:

1. A parallel computer system in which communications between a plurality of nodes are performed by use of a communication network constructed of a plurality of routing controllers connected respectively to said nodes, each of said plurality of routing controllers, comprising:
first barrier synchronization request message receiving means for receiving barrier synchronization request messages from other routing controller;
second barrier synchronization request message receiving means for receiving the barrier synchronization request message from said node connected to said routing controller itself;
storage means for storing a predetermined number of receipts defined as a number of the barrier synchronization request messages that should be received by said first barrier synchronization request message receiving means, a first item of node identification data defined as identification data of said node to which the barrier synchronization request message should be transmitted, and a second item of node identification data defined as identification data of said node to which the barrier synchronization establishment message should be transmitted;
first transmitting means for transmitting the barrier synchronization request message to said node identified by the first node identification data in the case of said storage means being stored with the first node identification data when completing receipts of the barrier synchronization request messages the number of which is equal to the predetermined number of receipts that is stored in said storage means, and completing receipts of the barrier synchronization request messages by said second barrier synchronization request message receiving means, for notifying said node connected to said first transmitting means itself of establishment of the barrier synchronization in the case of said storage means being stored with no first node identification data, and for transmitting the barrier synchronization establishment message to said node identified by the second node identification data in said storage means; and
second transmitting means for notifying said node connected to said second transmitting means itself of such a purport that the barrier synchronization is established when receiving the barrier synchronization establishment message with respect to said node connected to said second transmitting means itself from other routing controller, and for transmitting the barrier synchronization establishment message to said node identified by the second node identification data in said storage means.

2. A parallel computer system according to claim 1, wherein said storage means stores some pieces of second node identification data, said first transmitting means transmits the barrier synchronization establishment message to said each node identified by each piece of said second node identification data stored in said storage means in the case of said storage means being stored with no first node identification data when completing the receipts of the barrier synchronization request messages the number of which is equal to the predetermined number of receipts that is stored in said storage means, and completing the receipts of the barrier synchronization request messages by said second barrier synchronization request message receiving means.

3. A parallel computer system according to claim 1, wherein said each routing controller further comprises:

counting means for counting the number of receipts of the barrier synchronization request messages by said first barrier synchronization request message receiving means; and data outputting means for, when the number of receipts that is counted by said counting means is coincident with the predetermined number of receipts that is stored in said storage means, outputting data indicating this purport, and wherein said first transmitting means judges whether or not said first barrier synchronization request message receiving means receives the barrier synchronization request message the number of which is equal to the predetermined number of receipts that is stored in said storage means.

4. A parallel computer system according to claim 1, wherein said storage means stores some pieces of first node identification data, said first transmitting means transmits the barrier synchronization establishment message to said each node identified by each piece of said first node identification data in the case of said storage means being stored with one or more pieces of first node identification data when completing the receipts of the barrier synchronization request messages the number of which is equal to the predetermined number of receipts that is stored in said storage means, and completing the receipts of the barrier synchronization request messages by said second barrier synchronization request message receiving means.

5. A parallel computer system according to claim 1, wherein each of said plurality of routing controllers further comprises:

third transmitting means for transmitting a barrier synchronization establishment message ACK indicating that the barrier synchronization establishment message is received, to said routing controller that has transmitted, when receiving the barrier synchronization establishment message with respect to said node connected to said routing controller itself, this barrier synchronization establishment message;

fourth transmitting means for transmitting a barrier synchronization request message ACK indicating that the barrier synchronization request message is received, to said routing controller that has transmitted, when said first barrier synchronization request message receiving means receives the barrier synchronization request message, this barrier synchronization request message; and recognizing means for recognizing degrees of progress of processing for the barrier synchronization establishment message and the barrier synchronization request message by monitoring a state of receiving the barrier synchronization establishment message ACK and the barrier synchronization request message ACK.

6. A parallel computer system according to claim 5, wherein said third transmitting means, if the barrier synchronization establishment message received is invalid, transmits a barrier synchronization request message NAK indicating this purport to said routing controller which has transmitted the barrier synchronization establishment message, said fourth transmitting means, if the barrier synchronization establishment message received is invalid, transmits a barrier synchronization establishment message NAK, and said recognizing means monitors the states of receiving the barrier synchronization request message NAK and the barrier synchronization establishment message NAK and, when receiving one of the barrier synchronization request message NAK and the barrier synchronization establishment message NAK, notifies said node connected to said recognizing means itself of an occurrence of abnormality.

7. A parallel computer system according to claim 6, wherein said first transmitting means transmits the barrier synchronization request message containing group identification data for indicating a barrier synchronization group to which said routing controller belongs, and said second transmitting means judges whether the barrier synchronization request message is valid or not by use of the group identification data contained in the barrier synchronization request message received.

8. A parallel computer system according to claim 7, wherein said fourth transmitting means judges whether the barrier synchronization establishment message is valid or not by use of the group identification data contained in the barrier synchronization request message received.

9. A parallel computer system according to claim 1, wherein said node transmits the barrier synchronization request message containing the group identification data to said second barrier synchronization request message receiving means, said storage means stores plural items of barrier synchronization data containing the predetermined number of receipts, the first node identification data and the second node identification data, which are made corresponding to the group identification data, said first transmitting means determines whether or not the number of the barrier synchronization request messages received by said first barrier synchronization request message receiving means is coincident with the predetermined number of receipts for every piece of group identification data, and whether or not the receipt of the barrier synchronization request message by said second barrier synchronization request message receiving means is completed, and transmits the barrier synchronization request message containing the group identification data, and the barrier synchronization establishment message containing the group identification data, and said second transmitting means, when receiving the barrier synchronization establishment message with respect to said node connected via said other routing controller to said second transmitting means itself, notifies said node connected to said second transmitting means itself of such a purport that the barrier synchronization corresponding to the group identification data contained in the barrier synchronization establishment message is established, and transmits the barrier synchronization establishment message to said each node identified by said each piece of second node identification data contained in the barrier synchronization data in said storage means, which correspond to the group identification data.

10. A parallel computer system according to claim 1, wherein said node judges whether the barrier synchronization is established or not based on the data stored in a predetermined address on a memory incorporated thereinto, said first transmitting means and said second transmitting means, when each of said first and second transmitting means notifies said node connected to said transmitting means itself of the purport that the barrier synchronization is established, rewrite the data stored in the predetermined address on said memory incorporated into said node.

11. A parallel computer system according to claim 1, wherein said node transmits, to said second barrier synchronization request message receiving means, the barrier synchronization request message containing the address data indicating a storage position on said memory incorporated thereinto, of the data showing whether or not the barrier synchronization is established, and said first transmitting means and second transmitting means, when each of said first and second transmitting means notifies said node connected to said transmitting means itself of the purport that the barrier synchronization is established, rewrites the data designated by the address data contained in the barrier synchronization request message received within said memory.

12. A parallel computer system according to claim 1, wherein said routing controller further comprises a buffer for temporarily storing data received and data that should be transmitted, and said each transmitting means sets a virtual channel on said communication network by making use of said buffer and transmits each of the messages relative to the barrier synchronization by use of this virtual channel.

* * * * *